US012780705B2

(12) United States Patent
Nakamura et al.

(10) Patent No.: US 12,780,705 B2
(45) Date of Patent: Nov. 3, 2026

(54) WASTEWATER TREATMENT APPARATUS AND WASTEWATER TREATMENT METHOD

(71) Applicant: METAWATER Co., Ltd., Tokyo (JP)

(72) Inventors: Takashi Nakamura, Tokyo (JP); Shotaro Hatsuyama, Tokyo (JP); Shigehiro Suzuki, Tokyo (JP); Hiroyuki Takahashi, Tokyo (JP); Daisuke Naka, Tokyo (JP)

(73) Assignee: METAWATER Co., Ltd., Tokyo (JP)

( * ) Notice: Subject to any disclaimer, the term of this patent is extended or adjusted under 35 U.S.C. 154(b) by 305 days.

(21) Appl. No.: 18/834,140

(22) PCT Filed: Jan. 31, 2023

(86) PCT No.: PCT/JP2023/003056

§ 371 (c)(1),
(2) Date: Jul. 29, 2024

(87) PCT Pub. No.: WO2023/149425

PCT Pub. Date: Aug. 10, 2023

(65) Prior Publication Data

US 2025/0197264 A1 Jun. 19, 2025

(30) Foreign Application Priority Data

Feb. 1, 2022 (JP) ................................ 2022-014551

(51) Int. Cl.
*C02F 3/30* (2023.01)
*C02F 3/00* (2023.01)
*C02F 3/20* (2023.01)

(52) U.S. Cl.
CPC .............. *C02F 3/302* (2013.01); *C02F 3/006* (2013.01); *C02F 3/20* (2013.01); *C02F 3/301* (2013.01);
(Continued)

(58) Field of Classification Search
CPC ............ C02F 2209/005; C02F 2209/14; C02F 2209/15; C02F 3/006; C02F 3/301;
(Continued)

(56) References Cited

U.S. PATENT DOCUMENTS 3,994,802 A * 11/1976 Casey ...................... C02F 3/12
210/903
6,077,424 A * 6/2000 Katsukura ......... B01F 23/23342
210/197

(Continued)

FOREIGN PATENT DOCUMENTS

JP H08-318290 A 12/1996
JP 2008-221162 A 9/2008

(Continued)

OTHER PUBLICATIONS

Office Action and Search Report issued in corresponding Chinese patent application No. 202380018834.2, dated Dec. 17, 2025.

(Continued)

*Primary Examiner* — Nathan C Zollinger
(74) *Attorney, Agent, or Firm* — Rimon P.C.

(57) ABSTRACT

There is provided a wastewater treatment apparatus that: controls the air diffusion amount in a flow channel where wastewater is treated; forms a first-half aerobic region, a first-half combined-use region where both nitrification and denitrification progress, a denitrification region, a second-half combined-use region where both nitrification and denitrification progress, and a second-half aerobic region in the stated order from the upstream side; and produces first and second swirl flows constituting a pair. The wastewater treatment device also controls the air diffusion amount in the first-half aerobic region and the first-half combined-use region on the basis of a concentration of nitrate nitrogen and controls the air diffusion amount in the second-half com- (Continued)

bined-use region and the second-half aerobic region on the basis of the concentration of ammonia nitrogen.

6 Claims, 7 Drawing Sheets

(52) U.S. Cl.
CPC ...... *C02F 2209/14* (2013.01); *C02F 2209/15* (2013.01); *Y02W 10/10* (2015.05)

(58) Field of Classification Search
CPC ........ C02F 3/302; C02F 3/20; C02F 2101/16; C02F 2101/163; Y02W 10/10
See application file for complete search history.

(56) References Cited

U.S. PATENT DOCUMENTS

| | | | | |
|---|---|---|---|---|
| 9,522,832 | B2 * | 12/2016 | Furuya | C02F 3/006 |
| 10,040,711 | B2 * | 8/2018 | Graveleau | C02F 3/20 |
| 2006/0254979 | A1 * | 11/2006 | Koopmans | C02F 3/20 210/220 |
| 2014/0069864 | A1 * | 3/2014 | Wett | C02F 3/34 210/96.1 |
| 2014/0263041 | A1 | 9/2014 | Regmi et al. | |
| 2014/0374346 | A1 | 12/2014 | Furuya et al. | |
| 2016/0257587 | A1 | 9/2016 | Wett et al. | |
| 2016/0257590 | A1 | 9/2016 | Regmi et al. | |
| 2016/0264441 | A1 | 9/2016 | Graveleau et al. | |

FOREIGN PATENT DOCUMENTS

| | | | |
|---|---|---|---|
| JP | 2015-016410 | A | 1/2015 |
| JP | 2015-054260 | A | 3/2015 |
| JP | 2019-171235 | A | 10/2019 |
| JP | 2019-217484 | A | 12/2019 |
| WO | 2014/043547 | A1 | 3/2014 |
| WO | 2014/152872 | A1 | 9/2014 |

OTHER PUBLICATIONS

Extended European Search Report dated Oct. 28, 2025 issued in corresponding European patent application No. 23749741.7.
International Search Report received in PCT Application No. PCT/JP2023/003056, dated Apr. 11, 2023.

* cited by examiner

WASTEWATER TREATMENT APPARATUS AND WASTEWATER TREATMENT METHOD

CROSS-REFERENCE TO RELATED APPLICATIONS

This application is the U.S. National Phase under 35 U.S.C. § 371 of International Application No. PCT/JP2023/003056, filed on Jan. 31, 2023, which claims the benefit of foreign priority to Japanese Patent Application No. 2022-014551 filed on Feb. 1, 2022, the entire contents of each of which are hereby incorporated by reference.

TECHNICAL FIELD

The present disclosure relates to a wastewater treatment apparatus and a wastewater treatment method.

BACKGROUND ART

In methods for treating sewage and other forms of wastewater, ammonia nitrogen included in the wastewater is converted to nitrate nitrogen due to the action of nitrifying bacteria in an aerobic region where an air diffusion treatment is carried out, and the nitrate nitrogen is channeled out as nitrogen gas due to the action of denitrifying bacteria in a denitrification region where the air diffusion treatment is not carried out (for example, refer to Patent Document 1).

RELATED ART DOCUMENTS

Patent Documents

[Patent Document 1] Japanese Laid-Open Patent Application No. 2008-221162

DISCLOSURE OF THE INVENTION

Problems the Invention is Intended to Solve

However, the technology disclosed in Patent Document 1 requires a partitioning plate or a stirring vane, thus presenting a problem in terms of equipment costs.

Means for Solving the Aforementioned Problems

The wastewater treatment apparatus according to the present disclosure comprises: a tank that has a wastewater inlet, a flow channel where wastewater treatment is carried out, and a treated-water outlet; an air diffusion device in which a plurality of air diffusion parts are disposed along the flow channel of the tank and at the bottom of the flow channel; a first detection device that detects the concentration of nitrate nitrogen in the wastewater; a second detection device that detects the concentration of ammonia nitrogen in the wastewater, the second detection device being provided downstream of the first detection device; and a control device that controls the amount of air diffused from the plurality of air diffusion parts of the air diffusion device, the control device forming a first-half aerobic region, a first-half combined-use region where both nitrification and denitrification progress, a denitrification region, a second-half combined-use region where both nitrification and denitrification progress, and a second-half aerobic region in the stated order from the upstream side along the flow channel, and furthermore producing first and second swirl flows constituting a pair in the flow channel. The control device controls the air diffusion amount in the first-half aerobic region and the first-half combined-use region on the basis of the concentration of nitrate nitrogen detected by the first detection device and controls the air diffusion amount in the second-half combined-use region and the second-half aerobic region on the basis of the concentration of ammonia nitrogen detected by the second detection device. The first swirl flow rises in the first-half combined-use region, advances downstream at the water-surface side of the denitrification region, descends near the center of the denitrification region, and advances upstream at the bottom side of the denitrification region. The second swirl flow rises in the second-half combined use region, advances upstream at the water-surface side of the denitrification region, descends near the center of the denitrification region, and advances downstream at the bottom side of the denitrification region.

The wastewater treatment method according to the present disclosure is executed by a wastewater treatment apparatus comprising: a tank having a wastewater inlet, a flow channel where wastewater treatment is carried out, and a treated-water outlet; an air diffusion device in which a plurality of air diffusion parts are disposed along the flow channel of the tank and at the bottom of the flow channel; a first detection device that detects the concentration of nitrate nitrogen in the wastewater; and a second detection device that detects the concentration of ammonia nitrogen in the wastewater, the second detection device being provided downstream of the first detection device, the method comprising a step for controlling the amount of air diffused from the plurality of air diffusion parts of the air diffusion device, forming a first-half aerobic region, a first-half combined-use region where both nitrification and denitrification progress, a denitrification region, a second-half combined-use region where both nitrification and denitrification progress, and a second-half aerobic region in the stated order from the upstream side along the flow channel, and furthermore producing first and second swirl flows constituting a pair in the flow channel, and a step for controlling the air diffusion amount in the first-half aerobic region and the first-half combined-use region on the basis of the concentration of nitrate nitrogen detected by the first detection device in the step for producing the first and second swirl flows and controlling the air diffusion amount in the second-half combined-use region and the second-half aerobic region on the basis of the concentration of ammonia nitrogen detected by the second detection device in the step for producing the first and second swirl flows, the first swirl flow rising in the first-half combined-use region, advancing downstream at the water-surface side of the denitrification region, descending near the center of the denitrification region, and advancing upstream at the bottom side of the denitrification region, and the second swirl flow rising in the second-half combined use region, advancing upstream at the water-surface side of the denitrification region, descending near the center of the denitrification region, and advancing downstream at the bottom side of the denitrification region.

BEST MODE FOR CARRYING OUT THE INVENTION

An embodiment of the present disclosure is described below with reference to the accompanying drawings. However, the descriptions given below should not be interpreted to have a restrictive meaning and do not restrict the subject set forth in the claims. Various modifications, substitutions, and improvements can be made without departing from the intent and scope of the present disclosure. Different embodiments can also be combined as appropriate.

In the present disclosure, sewage, industrial wastewater, and the like are cited as examples of wastewater. The wastewater treatment apparatus (referred to below as the treatment apparatus, as appropriate) according to the present disclosure is particularly suitable for treating sewage.

Sewage or another form of wastewater is introduced into an initial precipitation reservoir (not shown), initially precipitated sludge sinks and is separated out, and a supernatant of the wastewater is introduced into the treatment apparatus according to the present disclosure as water to be treated. The water to be treated (the "wastewater" that is to be treated by the wastewater treatment apparatus according to the present disclosure) includes ammonia or another nitrogen component that is derived from excreta or the like. In the treatment apparatus according to the present disclosure, the wastewater is nitrified and denitrified so that the concentration of nitrogen in the wastewater can be reduced and so that the concentration of ammonia nitrogen can be brought to or below a permissible concentration before treated water is discharged.

Figure 1:
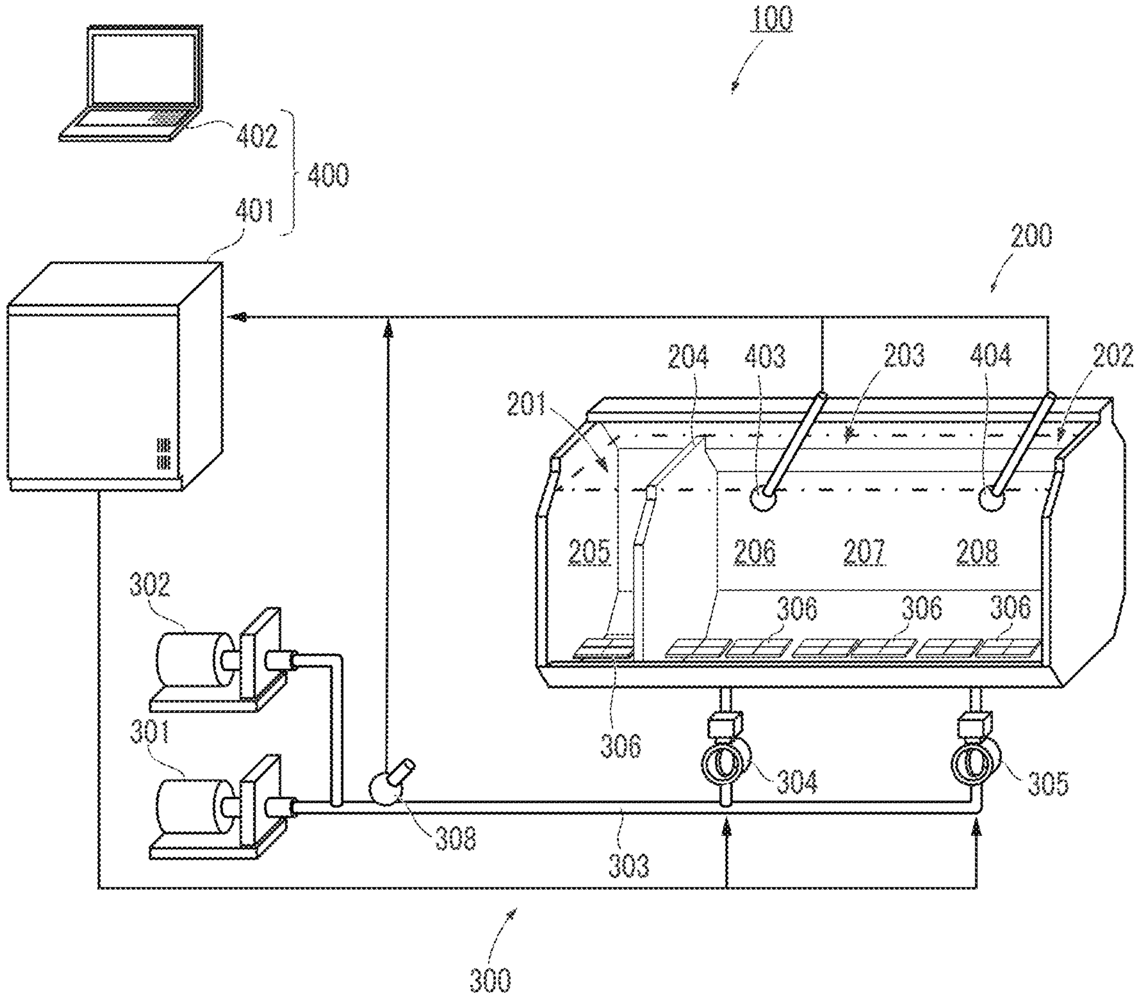
FIG. 1 is an explanatory diagram showing one embodiment of the treatment apparatus according to the present disclosure.
Figure 2:
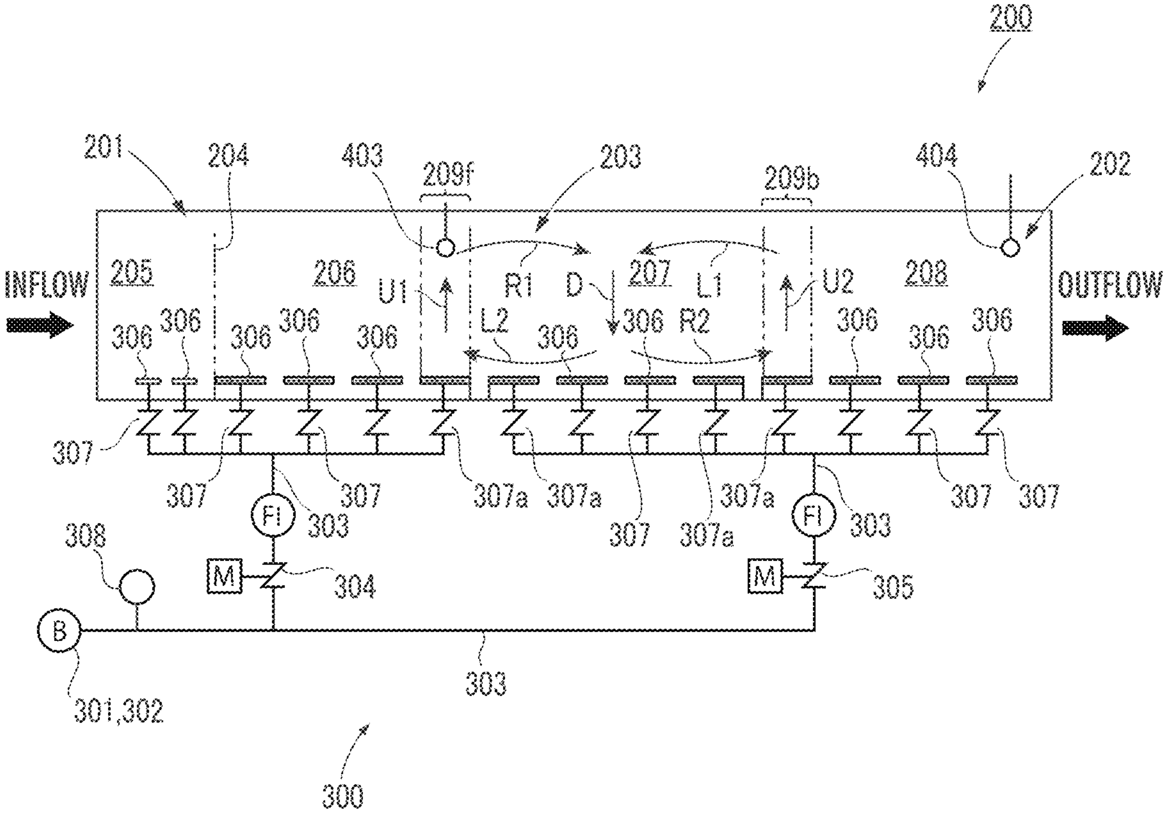
FIG. 2 is an explanatory diagram showing a configuration of an air diffusion device in the treatment apparatus according to the present disclosure.

FIGS. 1 and 2 show one embodiment of the treatment apparatus according to the present disclosure. The treatment apparatus 100 for treating wastewater shown in FIG. 1 comprises a treatment tank (referred to below as the tank, as appropriate) 200 in which wastewater is treated, an air diffusion device 300 that supplies oxygen-containing air (referred to below as the air, as appropriate) into the wastewater, a control system 400 that controls the air diffusion device 300, a first detection device 403, and a second detection device 404. The wastewater treatment apparatus is configured so that the nitrification and denitrification described earlier are carried out simultaneously in one tank (i.e., a single tank) and is also referred to as a single-tank nitrification and denitrification apparatus.

The tank 200 forms a gravity flow tank structure, the tank 200 having a wastewater inlet 201 at one end, having a treated-water outlet 202 at the other end, and having a wastewater flow channel 203 that extends from the inlet 201 to the outlet 202.

In the present embodiment, a partition wall 204 is disposed partway along a flow channel 203 and in a portion near an inlet 201, and such that wastewater flowing in through the inlet 201 flows into an anaerobic region 205 partitioned by the partition wall 204. The anaerobic region 205 plays a role in mixing the wastewater introduced via the initial precipitation reservoir (not shown) with returned sludge and releasing phosphorus that is contained in the returned sludge or in organic matter in the wastewater under anaerobic conditions. The phosphorus is subsequently captured in active sludge by an aerobic region, making it possible to reduce the phosphorus content of the wastewater. However, in the present invention, providing the partition wall 204 and the anaerobic region 205 is not essential, and it is permissible to use a tank 200 that does not have the partition wall 204 or the anaerobic region 205. Additionally, in the present disclosure, the wording "single tank" means that the portion excluding the anaerobic region 205 forms one tank that does not have a partition wall.

The air diffusion device 300 comprises a plurality of air diffusion parts 306. The plurality of air diffusion parts 306 are disposed along the flow channel 203 of the tank 200 and at the bottom (lower section) of the flow channel 203. In the case of the present embodiment, the air diffusion device 300 has a first blower 301, a second blower 302, and piping 303 linked to the first and second blowers 301, 302, the piping 303 being linked to the tank 200 via a first electric valve 304 and a second electric valve 305. The plurality of air diffusion parts are installed at the bottom of the tank 200 and along the flow channel 203. A pressure detection device 308 is attached partway along a flow channel in the piping 303 extending to the first electric valve 304. The present embodiment has two blowers, specifically the first and second blowers 301, 302, but it is also permissible to have one blower or three or more blowers.

As shown in FIG. 2, the piping 303 branches into a plurality of portions through the first and second electric valves 304, 305 and is connected to each of the air diffusion parts 306 via a manual valve 307. Therefore, adjusting the output of the first and second blowers 301, 302, the opening degrees of the first and second electric valves 304, 305, or the opening degrees of the manual valves 307 connected to each of the air diffusion parts 306 makes it possible to adjust the air diffusion amount sprayed from the air diffusion parts 306.

Manual valves 307*a* are positioned at boundary sections between regions that shall be described later.

With additional reference to FIG. 2, adjusting the amount of air diffused from the air diffusion parts 306 of the air diffusion device 300 in the remainder of the region passing through the partition wall 204 in the flow channel 203 of the tank 200 results in a first-half aerobic region 206, an upstream-side first-half combined-use region 209*f*, a denitrification region 207, a downstream-side second-half combined-use region 209*b*, and a second-half aerobic region 208 being formed in order from the side near the inlet 201. The first-half aerobic region 206 and the first-half combined-use region 209*f* positioned downstream therefrom constitute regions pertaining to a first-half aerobic region. Additionally, the second-half combined-use region 209*b* positioned downstream from the denitrification region 207 and the second-half aerobic region 208 positioned downstream from the second-half combined-use region 209*b* constitute regions pertaining to a second-half aerobic region. No partition wall is present at portions where the first-half aerobic region 206, the first-half combined-use region 209*f*, the denitrification region 207, the second-half combined-use region 209*b*, and the second-half aerobic region 208 are disposed in the flow channel 203, and these regions are formed by adjusting the air diffusion amount. In FIG. 1, the first-half combined-use region 209*f* and the second-half combined-use region 209*b* are omitted for convenience. The first-half combined-use region 209*f* and the second-half combined-use region 209*b* may be referred to collectively as combined-use regions 209.

The air diffusion parts 306 disposed in the first-half aerobic region 206, the first-half combined-use region 209*f*, the downstream-side second-half combined-use region 209*b*, and the second-half aerobic region 208 are configured to diffuse air once the corresponding manual valves 307, 307*a* are opened, and the air diffusion parts 306 disposed in the denitrification region 207 are configured to not diffuse air or to reduce the air diffusion amount once the corresponding manual valves 307, 307*a* are closed or throttled.

A diffused-air control in the present disclosure, including a step in which a control device 400 controls the amount of air diffused from the air diffusion parts 306 to produce first and second swirl flows constituting a pair, shall now be described with reference to arrows U1, U2, R1, R2, L1, L2, and D in FIG. 2. The first swirl flow is indicated by the arrows U1, R1, D, and L2, and the second swirl flow is indicated by the arrows U2, L1, D, and R2. The arrows U1 and U2 indicate rising flows, the arrow R1 indicates a water-surface forward flow, the arrow R2 indicates a bottom-surface forward flow, the arrow L1 indicates a water-surface reverse flow, the arrow L2 indicates a bottom-surface reverse flow, and the arrow D indicates a descending flow.

In the regions pertaining to the first-half aerobic region (the first-half aerobic region 206 and the first-half combined-use region 209*f*) and the regions pertaining to the second-half aerobic region (the second-half combined-use region 209*b* and the second-half aerobic region 208), rising flows (refer to the arrows U1 and U2) are produced by the diffused air, and the water surface rises. Therefore, at the downstream-side end section of the regions pertaining to the first-half aerobic region (the first-half aerobic region 206 and the first-half combined-use region 209*f*) and the upstream-side end section of the regions pertaining to the second-half aerobic region (the second-half combined-use region 209*b* and the second-half aerobic region 208), flows that advance toward the denitrification region 207 are produced on the water-surface side (refer to the arrows R1 and L1). These flows both descend near the center of the denitrification region 207 (refer to the arrow D), and furthermore advance outward from each other at the bottom side of the denitrification region 207 (refer to the arrows R2 and L2).

The combined use regions 209 where both nitrification and denitrification progress are respectively formed on the outer side of the denitrification region 207 adjacent to the regions pertaining to the first-half aerobic region (the first-half aerobic region 206 and the first-half combined-use region 209*f*) and on the outer side of the denitrification region 207 adjacent to the regions pertaining to the second-half aerobic region (the second-half combined-use region 209*b* and the second-half aerobic region 208).

In the treatment apparatus 100, the combined-use regions 209 serve as buffer regions; therefore, even if no partition wall is provided, it is possible for wastewater having a high concentration of dissolved oxygen in the first-half aerobic region 206 to mix with wastewater having a low concentration of dissolved oxygen in the denitrification region 207 due to a push-out flow or for wastewater having a high concentration of dissolved oxygen in the second-half aerobic region 208 to mix with wastewater having a low concentration of dissolved oxygen in the denitrification region 207 due to a flow that is the reverse of the push-out flow, and it is possible to effectively avoid loss of an oxygen-free or low-oxygen state in the denitrification region 207 and to cause a denitrification reaction to sufficiently progress. Additionally, a denitrification treatment is carried out in the combined-use regions as well as the denitrification region, and a nitrification treatment is also carried out in the combined-use regions; therefore, the denitrification region can be expanded without reducing the size of the aerobic regions, and it is possible to increase a denitrification treatment amount that can be employed as a target at the same tank volume or to reduce the tank volume while maintaining the same denitrification treatment amount.

In the treatment apparatus 100, the wastewater flowing in through the inlet 201 basically tends to be the push-out flow, which flows from the upstream side toward the downstream side along the flow channel 203 in the tank 200 and then flows out through the outlet 202 as treated water. However, near the denitrification region 207, a mixed flow in which there is intermixing between the wastewater having a high concentration of dissolved oxygen in the first-half aerobic region 206 or the second-half aerobic region 208 and the wastewater having a low concentration of dissolved oxygen in the denitrification region 207 is also produced, to the extent required for forming the combined-use regions 209, due to the swirl flows described above.

The fact that the swirl flows constitute a pair prevents the mixed flow from spreading, and the combined-use regions 209 are stably maintained.

Activated sludge that contains BOD oxidizing bacteria, nitrifying bacteria (ammonia-oxidizing bacteria, nitrite-oxidizing bacteria, etc.), denitrifying bacteria, or other microorganisms that break down organic matter in each region is formed in association with the wastewater treatment. The flows of activated sludge move together with the flow of wastewater in a state of being suspended in the wastewater. The action of the nitrifying bacteria or the action of the denitrifying bacteria increases in accordance with environmental conditions such as the concentration of oxygen in each region, and nitrification or denitrification occurs.

The treated water flowing out through the outlet 202 of the tank 200 is retained in a final precipitation reservoir, and the sludge at that location is separated out. Some of the separated sludge is returned to the inlet 201 as returned sludge, and excess sludge is extracted as surplus sludge.

As shown in FIG. 1, the control system 400 is provided in order to control the air diffusion device 300 and adjust the amount of air diffused from the air diffusion parts 306 disposed in the anaerobic region 205, the first-half aerobic region 206, the first-half combined-use region 209*f* (omitted from FIG. 1), the denitrification region 207, the second-half combined-use region 209*b* (omitted from FIG. 1), and the second-half aerobic region 208. The control system 400 is provided with a control device body 401, a terminal computer 402 that is connected to the control device body 401 in a wired or wireless manner, and a first detection device 403 and a second detection device 404 that are disposed in the tank 200.

The first detection device 403 is disposed downstream of the first-half aerobic region 206, preferably at a position closer to the denitrification region 207 than the flow-channel center in the first-half aerobic region 206, and more preferably is disposed immediately upstream of the combined-use region 209 formed downstream of the first-half aerobic region 206. The first detection device 403 detects the concentration of nitrate nitrogen in the wastewater, the nitrate nitrogen being composed of $NO_x$ species such as $NO_2$ and $NO_3$. Values detected by the first detection device 403 may be the concentration of the $NO_x$ species or the concentration of nitrogen derived from the $NO_x$ species.

The second detection device 404 is disposed downstream of the second-half aerobic region 208, preferably at a position closer to the outlet 202 than the flow-channel center in the second-half aerobic region 208, and more preferably is disposed near the downstream end of the second-half aerobic region 208 (at a position where the position is returned to the upstream side from the downstream end by an extent required for preserving the accuracy of the sensor). The second detection device 404 detects the concentration of ammonia nitrogen in the wastewater, the ammonia nitrogen being $NH_4OH$ or the like. Values detected by the second detection device 404 may be the concentration of the $NH_4OH$ or the concentration of nitrogen derived from the $NH_4OH$.

The control device body 401 is electrically connected to the first blower 301, the second blower 302, the pressure detection device 308, the first electric valve 304, the second electric valve 305, the first detection device 403, and the second detection device 404. The control device body 401 includes, e.g., an electronic circuit. Examples of such an electronic circuit include computers (PCs), field-programmable gate arrays (FPGAs), and application-specific integrated circuits (ASICs) that are configured to have a central processing unit (CPU), a storage medium such as a read-only memory (ROM) or a random-access memory (RAM), and a recording medium such as a hard disk.

In the control device body 401, a prescribed program with which it is possible to execute a wastewater treatment method or control method that shall be described later is stored in a recording medium. The control device body 401 outputs a control signal in accordance with the stored program on the basis of, inter alia, measurement value data inputted from the pressure detection device 308, the first detection device 403, and the second detection device 404 (as shall be described in greater detail later). The control device body 401 thereby controls the first blower 301, the second blower 302, the first electric valve 304, the second electric valve 305, and the like to control the amount of air diffused from the air diffusion parts 306 disposed in each region.

The terminal computer 402 is connected to the control device body 401 in a wired or wireless manner. The terminal computer 402 is used in order to manipulate the control system 400 from a remote location or to ascertain the operating state of the treatment apparatus 100 according to electronic data transmitted from the control system 400.

As mentioned earlier, the combined-use regions 209 where both nitrification and denitrification progress are formed on the outer side of the denitrification region 207 adjacent to the first-half aerobic region 206 and on the outer side of the denitrification region 207 adjacent to the second-half aerobic region 208, but the positions of the combined-use regions 209 can be set to desired positions or changed by opening or closing the manual valves 307 to thereby select the air diffusion parts 306 by which air diffusion is performed. The lengths of the first-half aerobic region 206, the denitrification region 207, and the second-half aerobic region 208 following the direction of the flow channel 203, and the volumes of these regions, are set according to the positions of the combined-use regions 209.

The control carried out by the control system 400 (control device body 401) in the treatment apparatus 100 shall be described in detail next with reference to FIGS. 3 and 4.

Figure 3:
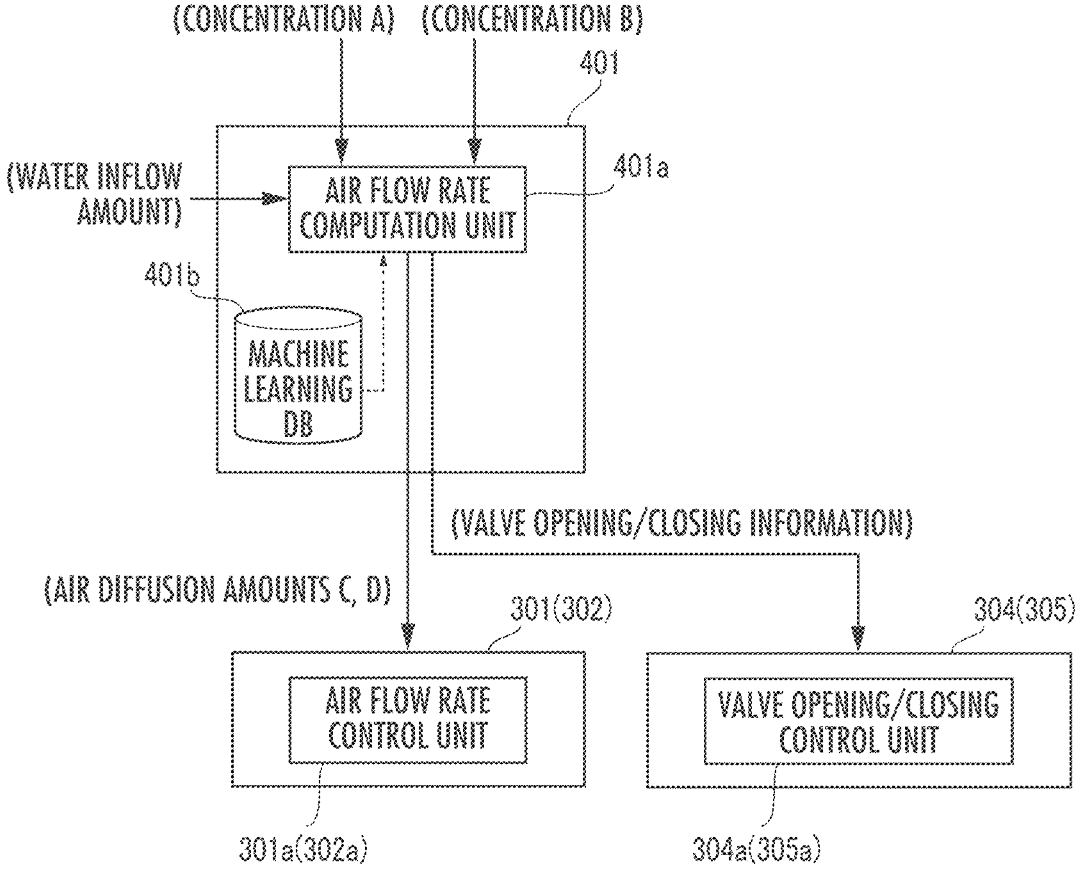
FIG. 3 is an explanatory diagram illustrating details of a control carried out by a control device body.
Figure 4:
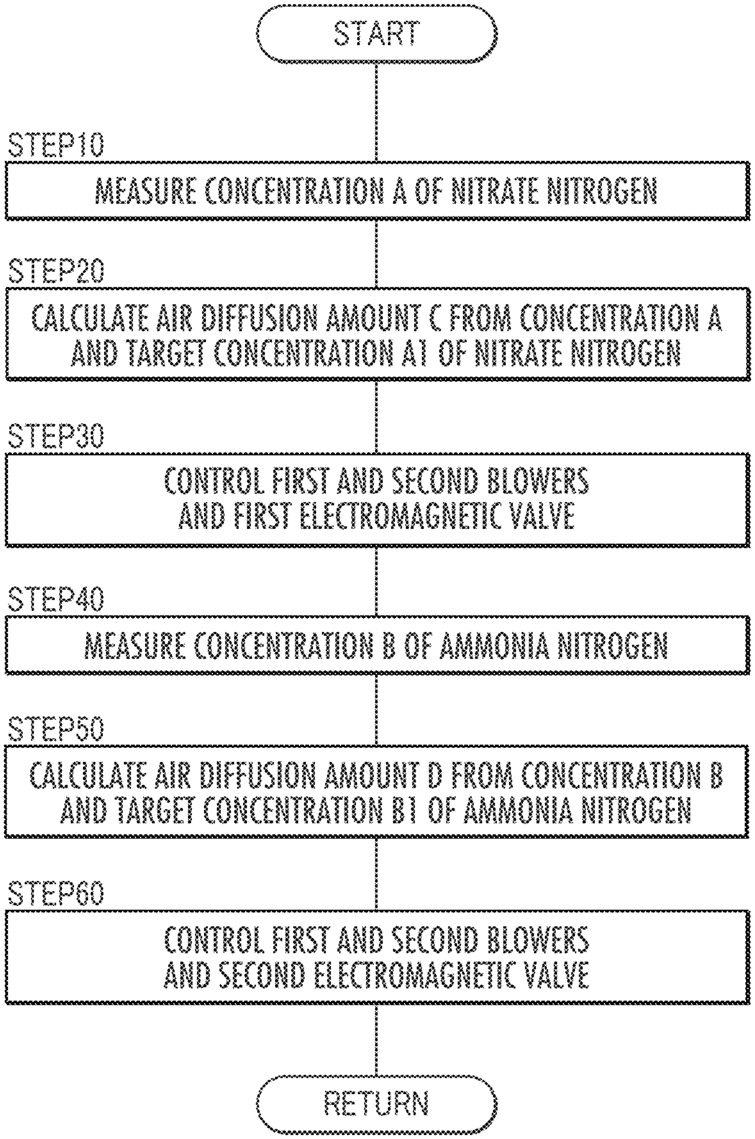
FIG. 4 is a diagram showing a flow chart of operation processes performed by the control device body.

As shown in FIG. 3, the control device body 401 is provided with an air flow rate computation unit 401*a* and a machine learning database (DB) 401*b*. Information such as the concentration A of nitrate nitrogen detected by the first detection device 403, the concentration B of ammonia nitrogen detected by the second detection device 404, and the water inflow amount flowing into the tank 200 is inputted to the air flow rate computation unit 401*a* (as shall be described in greater detail later).

The air flow rate computation unit 401*a* calculates an air diffusion amount C and an air diffusion amount D from the inputted information. When calculating the air diffusion amounts C, D, the air flow rate computation unit 401*a* may refer to information acquired through machine learning of past data stored in the machine learning DB 401*b*. The numeric values of the air diffusion amounts C, D vary according to the water temperature, the total nitrogen (T-N) load amount in the wastewater, the hydraulic retention time (HRT), and other factors, but optimal parameters for calculating the air diffusion amounts C, D can be automatically determined by referring to the aforementioned information. This makes it possible to stabilize water quality while reducing the load applied in tuning the air diffusion amount.

The air diffusion amounts C, D calculated by the air flow rate computation unit 401*a* are transmitted to the first and second blowers 301, 302. The first and second blowers 301, 302 are respectively provided with air flow rate control units 301*a*, 302*a*. The air flow rate control units 301*a*, 302*a* respectively control the outputs of the first and second blowers 301, 302 so that the air diffusion amounts C, D are obtained.

The control device body 401 also controls the valve opening degrees of the first and second electric valves 304, 305 to make adjustments so as to obtain the air diffusion amounts C, D. In order for such adjustments to be made, the air flow rate computation unit 401*a* transmits valve opening/closing information to the first and second electric valves 304, 305.

A flow chart of the operation processes performed by the control device body 401 of the control system 400 shall be described next with reference to FIG. 4.

First, the concentration A of nitrate nitrogen in the second-half region of the first-half aerobic region 206 is measured by the first detection device 403 (STEP10). The air diffusion amount C is then calculated from a target concentration A1 of nitrate nitrogen required for realizing a target denitrification amount (concentration) and the concentration A of nitrate nitrogen in the second-half region of the first-half aerobic region 206 (STEP20).

Specifically, the concentration A and the target concentration A1 of nitrate nitrogen are compared, and the air diffusion amount C in the first-half aerobic region 206 and the first-half combined-use region 209*f* is established using, e.g., formula 1 below so that the concentration A of nitrate nitrogen when the wastewater has passed through the first-half aerobic region 206 reaches the target concentration A1 of nitrate nitrogen.

$$C = P\times(A1 - A) \qquad \text{(Formula 1)}$$

In the formula, P is a coefficient established from the relationship between the air diffusion amount and the nitrification speed in the first-half aerobic region 206 and can be empirically established in advance.

P can be calculated using a plurality of parameters p1, p2, p3, . . . that are established according to the water temperature, the total nitrogen (T-N) load amount in the wastewater, the hydraulic retention time (HRT), and other treatment conditions. The optimal numeric values for the parameters p1, p2, p3, . . . can be determined using the machine learning DB 401*b* described above.

Next, the outputs of the first and second blowers 301, 302 and the opening degree of the first electric valve 304 are controlled so that the air diffusion amount in the first-half aerobic region 206 and the first-half combined-use region 209*f* reaches the air diffusion amount C (STEP30).

Next, the concentration B of ammonia nitrogen in the second-half region of the second-half aerobic region 208 is measured by the second detection device 404 (STEP40). The air diffusion amount D is then calculated from the concentration B of ammonia nitrogen in the second-half region of the second-half aerobic region 208 and a target concentration B1 of ammonia nitrogen permitted to remain in the treated liquid flowing out through the second-half aerobic region 208 (STEP50).

Specifically, the concentration B and the target concentration B1 of ammonia nitrogen are compared, and the air diffusion amount D in the second-half aerobic region 208 and the second-half combined-use region 209*b* is established using, e.g., formula 2 below so that the concentration of ammonia nitrogen in the treated water that has passed through the second-half aerobic region 208 falls to or below the target concentration B1 of ammonia nitrogen.

$$D = Q \times (B - B1) \quad \text{(Formula 2)}$$

In the formula, Q is a coefficient established from the relationship between the air diffusion amount and the nitrification speed in the second-half aerobic region 208 and can be empirically established in advance.

Q can be calculated using a plurality of parameters q1, q2, q3, . . . that are established according to the water temperature, the total nitrogen (T-N) load amount in the wastewater, the hydraulic retention time (HRT), and other treatment conditions. The optimal numeric values for the parameters q1, q2, q3, . . . considering external factors can be determined using the machine learning DB 401*b* described above.

Next, the outputs of the first and second blowers 301, 302 and the opening degree of the second electric valve 305 are controlled so that the air diffusion amount in the second-half aerobic region 208 and the second-half combined-use region 209*b* reaches the air diffusion amount D (STEP60). The series of operation processes performed by the control device body 401 then ends. However, by repeatedly performing the processes described above, the control device body 401 can carry out desired air diffusion in each region of the tank 200.

A nitrification and denitrification method using the treatment apparatus 100 according to the present disclosure shall be described next.

The sewage or other form of wastewater is introduced into the anaerobic region 205 through the initial precipitation reservoir (not shown). The returned sludge, which is returned from a sludge collection part (not shown), is also introduced together with the wastewater. The anaerobic region 205 is kept in an anaerobic state; therefore, phosphorus contained in the returned sludge is released under anaerobic conditions. The phosphorus is subsequently captured by microorganisms in the first-half aerobic region 206, the denitrification region 207, and the second-half aerobic region 208 and is removed from the wastewater as sludge.

The wastewater that is treated for a prescribed period of time in the anaerobic region 205 flows through a cutout-form opening formed below the partition wall 204 and flows into the first-half aerobic region 206. In the first-half aerobic region 206, control is carried out so as to reach the air diffusion amount established according to formula 1. Therefore, the nitrifying bacteria are activated, the ammonia nitrogen contained in the wastewater is nitrified, nitrate nitrogen is produced, and the concentration of nitrate nitrogen rises. Specifically, the concentration of nitrate nitrogen ($NO_x$—N) rises from the first-half aerobic region 206 to the denitrification region 207 (denitrification region and inlet section).

In this instance, the concentration of nitrate nitrogen ($NO_x$—N) in the denitrification region 207 (inlet section) reaches the target concentration A1 of nitrate nitrogen because the air diffusion amount in the first-half aerobic region 206 and the first-half combined-use region 209*f* is controlled according to formula 1. In order for the oxygen-free state to subsequently be maintained in the denitrification region 207, the air diffusion amount in the first-half aerobic region 206 and the first-half combined-use region 209*f* is controlled so as to be sufficient for reaching the target concentration A1 of nitrate nitrogen but not to be excessive.

The wastewater that has passed through the first-half aerobic region 206 is introduced into the denitrification region 207 via the first-half combined-use region 209*f*. In the denitrification region 207, denitrification is performed by the denitrifying bacteria because the amount of air diffused from the air diffusion parts 306 is controlled by the control device body 401 and the oxygen-free or low-oxygen state is maintained. In this instance, nitrate nitrogen in the concentration that has reached the target concentration A1 of nitrate nitrogen formed in the first-half aerobic region 206 is denitrified, whereby nitrogen corresponding to the target denitrification amount is removed from the wastewater.

Next, the wastewater that has passed through the denitrification region 207 is introduced into the second-half aerobic region 208 via the second-half combined-use region 209*b*. In the second-half aerobic region 208, the ammonia nitrogen remaining in the wastewater is nitrified and becomes nitrate nitrogen because the amount of air diffused from the air diffusion parts 306 is controlled by the control device body 401 and an aerobic state is achieved again. The concentration of ammonia nitrogen in the wastewater that has passed through the denitrification region 207 falls to or below the target concentration B1 of ammonia nitrogen permitted to remain in the treated water because the air diffusion amount in the second-half aerobic region 208 and the second-half combined-use region 209*b* is controlled so as to reach the air diffusion amount established according to formula 2.

Thus, the treated water that has passed through the second-half aerobic region 208 not only undergoes a decrease in the concentration of ammonia nitrogen but also undergoes a decrease in nitrogen concentration overall and is made even less hazardous. The treated water is discharged to a river or the like after chlorine disinfection or another ordinary treatment.

As described above, the treatment apparatus 100 compares the target concentration A1 of nitrate nitrogen required for realizing the target denitrification amount (concentration) with the concentration A of nitrate nitrogen in the second-half region of the first-half aerobic region 206 and controls the air diffusion amount C in the first-half aerobic region 206 and the first-half combined-use region 209*f* so that the concentration of nitrate nitrogen when the wastewater has passed through the first-half aerobic region 206 reaches the target concentration A1 of nitrate nitrogen. Therefore, it is possible to form nitrate nitrogen in the first-half aerobic region 206 so that a denitrification amount required for reducing the concentration of nitrogen contained in the wastewater to a prescribed value or therebelow can be ensured while maintaining the oxygen-free or low-oxygen state in the denitrification region 207. As a result, it is possible to reduce the concentration of nitrogen contained in the wastewater to the prescribed value or therebelow and realize the target denitrification amount in the denitrification region 207.

Additionally, the treatment apparatus 100 compares the concentration B of ammonia nitrogen in the second-half region of the second-half aerobic region 208 with the target concentration B1 of ammonia nitrogen permitted to remain in the treated water and controls the air diffusion amount D in the second-half aerobic region 208 and the second-half combined-use region 209*b* so that the concentration of ammonia nitrogen in the treated water that has passed through the second-half aerobic region 208 falls to or below the target concentration B1 of ammonia nitrogen; therefore, it is possible to reduce the concentration of ammonia nitrogen remaining in the treated water to or below the target concentration B1 of ammonia nitrogen.

In the nitrification and denitrification method according to the present disclosure, rising flows are produced by the diffused air in the first-half aerobic region 206 and the second-half aerobic region 208, as indicated by the arrows in FIG. 2, and the water surface rises. Therefore, the pair of swirl flows described earlier are produced, and the combined-use regions 209 where both nitrification and denitrification progress are formed on the outer side of the denitrification region 207 adjacent to the first-half aerobic region 206 and on the outer side of the denitrification region 207 adjacent to the second-half aerobic region 208.

It is thereby possible, in the nitrification and denitrification method according to the present disclosure, to maintain the oxygen-free or low-oxygen state in the denitrification region 207 and to cause a denitrification reaction to progress, even if no partition wall is provided. Additionally, the denitrification treatment is carried out in the combined-use regions 209 as well as the denitrification region 207, and the nitrification treatment is also carried out in the combined-use regions 209. Therefore, the denitrification region can be expanded without reducing the size of the aerobic regions, and it is possible to increase the denitrification treatment amount that can be employed as a target at the same tank volume. It is also unnecessary to provide a partition wall to the tank 200, and it is possible to reduce equipment costs.

In the treatment apparatus 100, the open/closed state of the manual valves 307*a* at the boundaries between regions is changed according to the weather or the season when the amount of wastewater to be treated or the concentration of organic matter varies, thereby making it possible to change the positions of the combined-use regions 209 and change the volume and length of the first-half aerobic region 206, the denitrification region 207, and the second-half aerobic region 208. The treatment apparatus 100 is also configured so that the position of the first detection device 403 can be moved in association with any change in the positions of the combined-use regions 209.

It is thereby possible to switch the manual valves 307*a* and make it possible to maintain the concentration of ammonia nitrogen remaining in the treatment water at or below the target concentration B1 of ammonia nitrogen so that the volume and length of the first-half aerobic region 206 and the second-half aerobic region 208 increase when, for example, the amount of wastewater or the organic matter load in the wastewater increases.

It is also possible to compare the difference (A1−A) in formula 1 between the target concentration A1 of nitrate nitrogen required for realizing the target denitrification amount (concentration) and the concentration A of nitrate nitrogen in the second-half region of the first-half aerobic region 206 with the difference (B−B1) in formula 2 between the concentration B of ammonia nitrogen in the second-half region of the second-half aerobic region 208 and the target concentration B1 of ammonia nitrogen permitted to remain in the treated liquid flowing out through the second-half aerobic region 208, and to manipulate the manual valves 307*a* and change the positions of the combined-use regions 209 so as to achieve a more balanced distribution of regions.

In such a scenario, the valves that control the individual air diffusion parts 306 in the present embodiment are all manual valves 307, but it is also permissible to replace the manual valves 307*a* located at positions adjacent to the regions with electric valves and change the opening degrees of each of the valves, thereby making it possible to change the volume and length of the regions.

The amount of air diffused from the air diffusion parts 306 in the denitrification region 207 can be set to 0, but a very small amount of air diffusion with which the sludge continues to be suspended in the wastewater and sedimentation is prevented is permitted. This makes it unnecessary to provide a stirring vane or the like to the denitrification region 207 and makes it possible further reduce equipment costs.

As described above, the control device 401 executes a step for controlling the amount of air diffused from the plurality of air diffusion parts 306 of the air diffusion device 300, forming the first-half aerobic region 206, the first-half combined-use region 209*f* where both nitrification and denitrification progress, the denitrification region 207, the second-half combined-use region 209*b* where both nitrification and denitrification progress, and the second-half aerobic region 208 in the stated order from the upstream side along the flow channel 203, and furthermore producing first and second swirl flows constituting a pair in the flow channel 203.

In this step, the control device 401 controls the air diffusion amount in the first-half aerobic region 206 and the first-half combined-use region 209*f* on the basis of the concentration of nitrate nitrogen detected by the first detection device 403, and controls the air diffusion amount in the second-half combined-use region 209*b* and the second-half aerobic region 208 on the basis of the concentration of ammonia nitrogen detected by the second detection device 404. The first swirl flow is a flow that rises in the first-half combined-use region 209*f* (refer to the arrow U1), advances downstream at the water-surface side of the denitrification region 207 (refer to the arrow R1), descends near the center of the denitrification region 207 (refer to the arrow D), and advances upstream at the bottom side of the denitrification region 207 (refer to the arrow L2). The second swirl flow is a flow that rises in the second-half combined use region 209*b* (refer to the arrow U2), advances upstream at the water-surface side of the denitrification region 207 (refer to the arrow L1), descends near the center of the denitrification region 207 (refer to the arrow D), and advances downstream at the bottom side of the denitrification region 207 (refer to the arrow R2).

In the treatment apparatus 100, a sufficient denitrification treatment amount can be obtained irrespective of the lack of any partition plate because the combined-use regions 209 serve as buffer regions and the low-oxygen state of the denitrification region 207 is maintained largely without being affected by an oxygen-rich forward flow from the first-half aerobic region 206 or an oxygen-rich backward flow from the second-half aerobic region 208. Additionally, it is possible to avoid major investments in equipment because the partition plate is unnecessary.

Additionally, the denitrification region 207 can be expanded without reducing the size of the aerobic regions, and it is possible to meet demands for increasing the denitrification treatment amount at the same tank volume or demands for reducing the tank volume while maintaining the same denitrification treatment amount, because the denitrification treatment is carried out in the combined-use regions 209 as well as the denitrification region 207 and the nitrification treatment is also carried out in the combined-use regions 209.

Furthermore, it is possible to carry out treatment so that: the air diffusion amount in the regions pertaining to the first-half aerobic region 206 is controlled on the basis of the concentration of nitrate nitrogen measured by the first detection device 403 disposed downstream of the first-half aerobic region 206, whereby the concentration of nitrate nitrogen in the wastewater flowing into the denitrification region 207 is adjusted; and the air diffusion amount in the regions pertaining to the second-half aerobic region 208 is controlled on the basis of the concentration of ammonia nitrate measured by the second detection device 404 disposed downstream of the second-half aerobic region 208, whereby nitrification is sufficiently carried out in the second-half aerobic region 208 and the concentration of remaining ammonia nitrogen stays within a permissible range.

The air diffusion device 300 has a plurality of openable/closable air diffusion parts 306 along the flow channel 203. The air diffusion device 300 is configured so that selecting the air diffusion parts 306 by which air diffusion is performed makes it possible to change the position of either of the first-half combined-use region 209*f* or the second-half combined-use region 209*b*, and is configured so that the position of either of the first detection device or the second detection device can be moved in accordance with the change in the position of the first-half combined-use region 209*f* or the second-half combined-use region 209*b*. The "plurality of openable/closable air diffusion parts" are assumed to be, inter alia, a plurality of air diffusion parts configured to be switched between constrained aeration and unconstrained aeration by the electric valves.

According to this configuration, the air diffusion parts 306 by which air diffusion is performed are selected in accordance with treatment conditions pertaining to the facility where the present disclosure is applied or variations in the wastewater load caused by variations in the weather or the season because selecting the air diffusion parts 306 by which air diffusion is performed in the air diffusion device 300 makes it possible to vary the positions of the combined-use regions 209; this makes it possible to change the positions of the combined-use regions 209 to make adjustments so that each region is set to a suitable length. Additionally, the position of the first detection device 403 can be disposed downstream of the first-half aerobic region 206 at all times, even if the length of the first-half aerobic region 206 changes, because the air diffusion device 300 is configured so that the position of the first detection device 403 can be moved in accordance with the change in the positions of the combined-use regions 209.

The control device 401 is configured so that: the air diffusion amount in the first-half aerobic region 206 and the first-half combined-use region 209*f* is controlled on the basis of the difference between the target concentration of nitrate nitrogen in the first-half aerobic region 206, which is set so that the denitrification amount required for reducing the concentration of nitrogen contained in the wastewater to a prescribed value or therebelow can be ensured in the denitrification region 207 and so that a prescribed oxygen-free or low-oxygen state can be formed in the denitrification region 207 and the concentration of nitrate nitrogen detected by the first detection device 403; and the air diffusion amount in the second-half combined-use region 209*b* and the second-half aerobic region 208 is controlled on the basis of the difference between the concentration of ammonia nitrogen detected by the second detection device 404 and the target concentration of ammonia nitrogen permitted to remain in the treated water.

According to the aspect described above, the air diffusion amount in regions pertaining to the first-half aerobic region 206 is controlled, on the basis of the difference between the target concentration A1 of nitrate nitrogen in the first-half aerobic region 206 and the concentration A of nitrate nitrogen detected by the first detection device 403, so that the concentration A of nitrate nitrogen approaches the target concentration A1 of nitrate nitrogen, thereby making it possible to sufficiently ensure the concentration of nitrate nitrogen in the wastewater flowing into the denitrification region 207 and to ensure the required denitrification amount. Additionally, the air diffusion amount in the regions pertaining to the second-half aerobic region 208 is controlled on the basis of the difference between the concentration B of ammonia nitrogen detected by the second detection device 404 and the target concentration B1 of ammonia nitrogen permitted to remain in the treated water, thereby making it possible to reduce the concentration of ammonia nitrogen so as to fall to or below the target concentration of ammonia nitrogen permitted to remain in the treated water.

EXAMPLES

Test Example 1

Sewage was treated using the treatment apparatus 100 shown in FIGS. 1 and 2 while the amount of diffusion air from the air diffusion device 300 was controlled by the control system 400. The result of the treatment shall be described below.

(1) Water quality and treatment amount for the sewage after flowing out from the initial precipitation reservoir are as indicated below.
- Total nitrogen (T-N): 30 mg N/L
- Concentration of ammonia nitrogen ($NH_4$—N): 23 mg N/L
- Amount of water: 26,740 $m^3$/day/system
- T-N load amount: 802.2 kg N/day/system
- HRT: 10.3 hr (2) Water quality and treatment amount for the returned sludge are as indicated below.
- Concentration of nitrate nitrogen ($NO_x$—N): 10.3 mg N/L
- Return rate: 50%
- Amount of sludge: 13,370 $m^3$/day/system
- $NO_x$—N load amount: 138.16 kg N/day/system (3) Water quality at end of first-half aerobic region
- $NH_4$—N: 10.3 mg N/L
- $NO_x$—N: 5 mg N/L
- Amount of water+amount of sludge: 40,110 $m^3$/day/system
- $NO_x$—N load amount: 200.6 kg N/day/system (4) Water quality at end of denitrification region
$NH_4$—N: 10.3 mg N/L
$NO_x$—N: 0 mg N/L
Amount of water+amount of sludge: 40,110 $m^3$/day/system
$NO_x$—N load amount: 0 kg N/day/system (5) Water quality at end of second-half aerobic region
$NH_4$—N: 0.0 mg N/L
$NO_x$—N: 10.3 mg N/L
Amount of water+amount of sludge: 40,110 $m^3$/day/system
$NO_x$—N load amount: 414.5 kg N/day/system (6) Water quality at final precipitation outlet
Total nitrogen (T-N): 12 mg N/L
$NO_x$—N: 10.3 mg/L
Amount of water: 26,740 $m^3$/day/system
T-N load amount: 320.9 kg N/day/system
T-N removal rate: 60%

(7) Surplus sludge
N content: 10%
Activated sludge suspended solids (MLSS): 4000 mg/L
Amount of sludge: 376 $m^3$/day/system
Load amount: 150.4 kg N/day/system As indicated by the above results, the total nitrogen (T-N) removal rate for the treated water was 60%, and the concentration of ammonia in the treated water was able to be set to 0.0 mg N/L.

Test Example 2

Sewage was continuously treated using the treatment apparatus 100 shown in FIGS. 1 and 2 while the amount of diffusion air from the air diffusion device 300 was controlled by the control system 400. The biochemical oxygen demand (BOD) concentration, the total nitrogen (T-N) concentration, and the total phosphorus (T-P) concentration at an initial precipitation outlet and a final precipitation outlet were periodically measured, and any change in these concentrations was examined.

The BOD concentration was measured according to the method described in "Sewage testing methods—2012 edition—volume 2, chapter 1, section 21, 1. Biochemical oxygen demand (BOD)." The T-N concentration was measured according to the method described in JIS K 0170-3 on the basis of "Sewage testing methods—2012 edition—volume 1, chapter 5, section 13, Flow analysis." The T-P concentration was measured according to the method described in JIS K 0170-4 on the basis of "Sewage testing methods—2012 edition—volume 1, chapter 5, section 13, Flow analysis."

Figure 5:
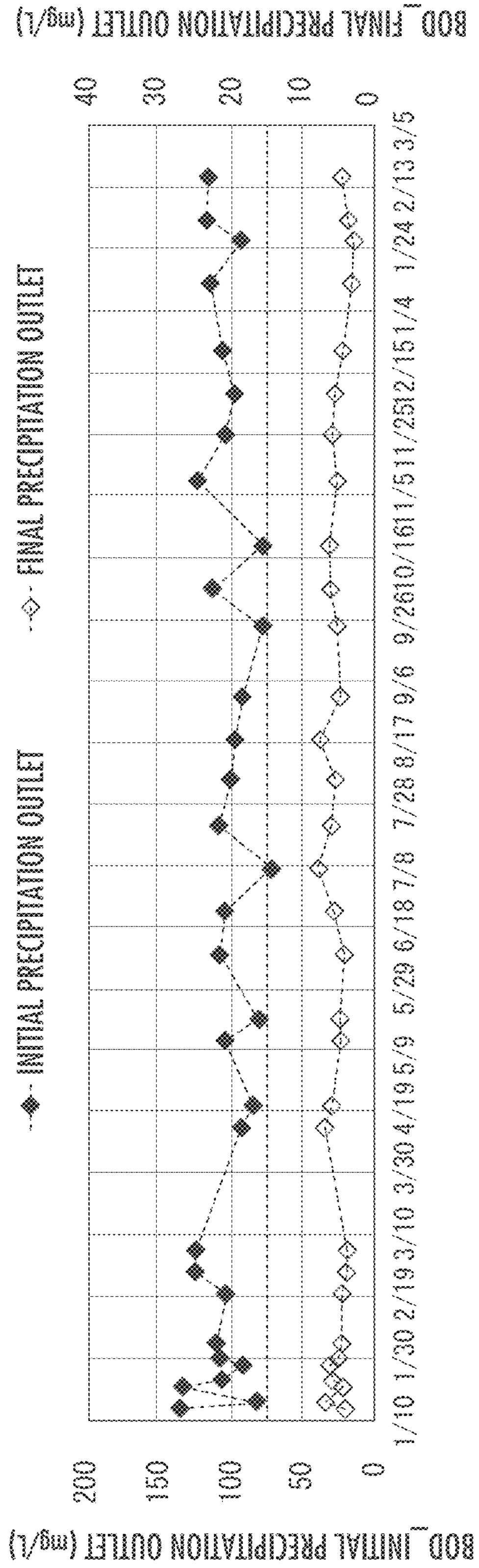
FIG. 5 is a graph showing a change in BOD concentration at an initial precipitation outlet and a final precipitation outlet when wastewater treatment is carried out using the treatment apparatus according to the present disclosure.
Figure 6:
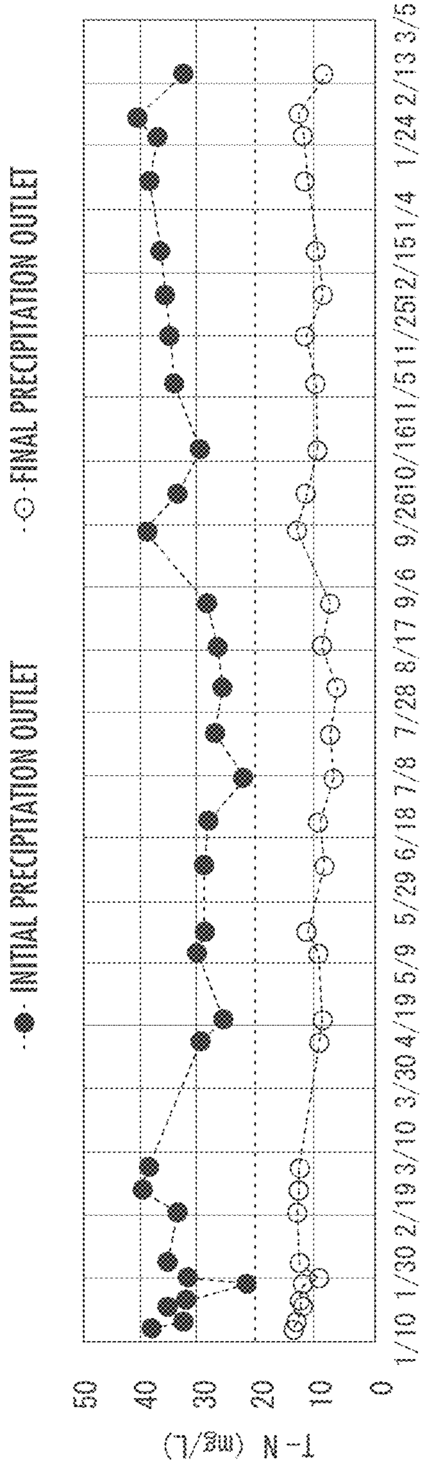
FIG. 6 is a graph showing a change in T-N concentration at the initial precipitation outlet and the final precipitation outlet when the wastewater treatment is carried out using the treatment apparatus according to the present disclosure.
Figure 7:
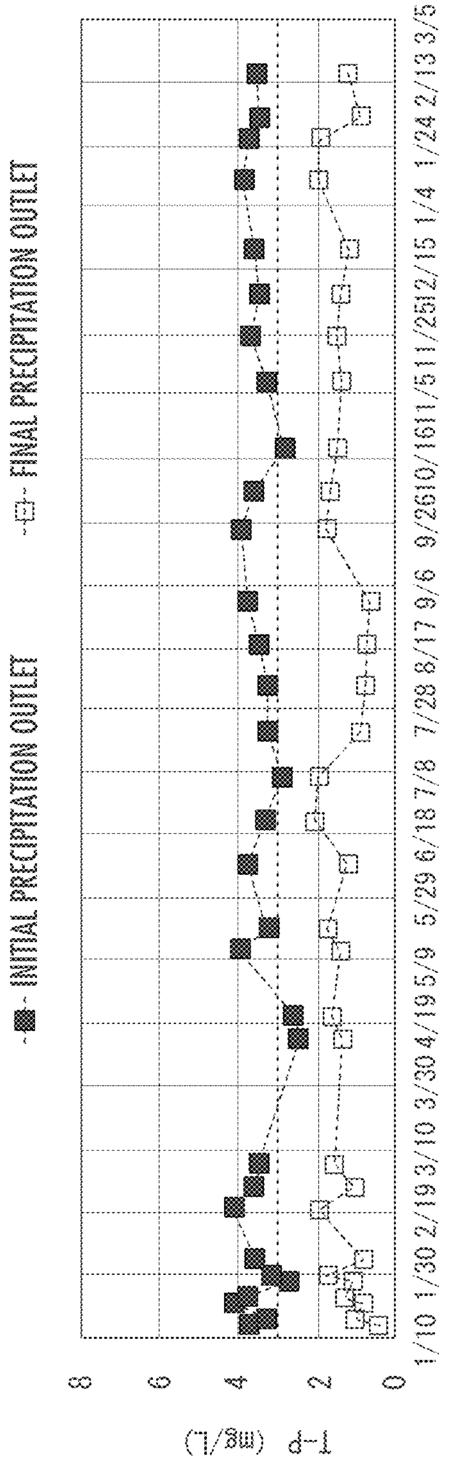
FIG. 7 is a graph showing a change in T-P concentration at the initial precipitation outlet and the final precipitation outlet when the wastewater treatment is carried out using the treatment apparatus according to the present disclosure.

A testing operation was carried out continuously for one year or longer to conduct measurement. The measurement results for the BOD concentration are shown in FIG. 5, the measurement results for the T-N concentration are shown in FIG. 6, and the measurement results for the T-P concentration are shown in FIG. 7. The dashed lines in the drawings represent respective target reduction values.

As shown in FIGS. 5, 6, and 7, the nitrification and denitrification method using the treatment apparatus 100 according to the present invention makes it possible to reduce BOD, T-N, and T-P stably over one year or more.

KEY

100 Treatment apparatus
200 Tank
201 Inlet
202 Outlet
203 Flow channel
204 Partition wall
205 Anaerobic region
206 First-half aerobic region
207 Denitrification region
208 Second-half aerobic region
209 Combined-use region
**209*f*** First-half combined-use region
**209*b*** Second-half combined-use region
300 Air diffusion device
301 First blower
**301*a*** Air flow rate control unit
302 Second blower
**302*a*** Air flow rate control unit
303 Piping
304 First electric valve
**304*a*** Valve opening/closing control unit
305 Second electric valve
**305*a*** Valve opening/closing unit
306 Air diffusion part
307 Manual valve
**307*a*** Manual valve
308 Pressure detection device
400 Control system
401 Control device body
**401*a*** Air flow rate computation unit
**401*b*** Machine learning database
402 Terminal computer
403 First detection device
404 Second detection device

The invention claimed is:

1. A wastewater treatment apparatus comprising:
a tank that has a wastewater inlet, a flow channel where wastewater treatment is carried out, and a treated-water outlet;
an air diffusion device in which a plurality of air diffusion parts are disposed along the flow channel of the tank and at the bottom of the flow channel;
a first detection device that detects the concentration of nitrate nitrogen in the wastewater;
a second detection device that detects the concentration of ammonia nitrogen in the wastewater, the second detection device being provided downstream of the first detection device; and
a control device that controls the amount of air diffused from the plurality of air diffusion parts of the air diffusion device, the control device forming a first-half aerobic region, a first-half combined-use region where both nitrification and denitrification progress, a denitrification region, a second-half combined-use region where both nitrification and denitrification progress, and a second-half aerobic region in the stated order from the upstream side along the flow channel, and furthermore producing first and second swirl flows constituting a pair in the flow channel,
the control device
controlling the air diffusion amount in the first-half aerobic region and the first-half combined-use region on the basis of the concentration of nitrate nitrogen detected by the first detection device and
controlling the air diffusion amount in the second-half combined-use region and the second-half aerobic region on the basis of the concentration of ammonia nitrogen detected by the second detection device,
the first swirl flow rising in the first-half combined-use region, advancing downstream at the water-surface side of the denitrification region, descending near the center of the denitrification region, and advancing upstream at the bottom side of the denitrification region, and the second swirl flow rising in the second-half combined use region, advancing upstream at the water-surface side of the denitrification region, descending near the center of the denitrification region, and advancing downstream at the bottom side of the denitrification region.

2. The wastewater treatment apparatus according to claim 1, wherein: the air diffusion device has a plurality of openable/closable air diffusion parts along the flow channel; and the air diffusion device is configured so that selecting the air diffusion parts by which air diffusion is performed makes it possible to vary the position of either of the first-half combined-use region or the second-half combined-use region, and is configured so that the position of either of the first detection device or the second detection device can be moved in accordance with the variation in the position of the first-half combined-use region or the second-half combined-use region.

3. The treatment apparatus according to claim 1, wherein the control device is configured so that:

the air diffusion amount in the first-half aerobic region and the first-half combined-use region is controlled on the basis of the difference between the concentration of nitrate nitrogen detected by the first detection device and the target concentration of nitrate nitrogen in the first-half aerobic region, which is set so that a denitrification amount required for reducing the concentration of nitrogen contained in the wastewater to a prescribed value or therebelow can be ensured in the denitrification region and so that a prescribed low-oxygen state can be formed in the denitrification region; and the air diffusion amount in the second-half combined-use region and the second-half aerobic region is controlled on the basis of the difference between the concentration of ammonia nitrogen detected by the second detection device and the target concentration of ammonia nitrogen permitted to remain in the treated water.

4. A wastewater treatment method executed by a wastewater treatment apparatus comprising: a tank having a wastewater inlet, a flow channel where wastewater treatment is carried out, and a treated-water outlet; an air diffusion device in which a plurality of air diffusion parts are disposed along the flow channel of the tank and at the bottom of the flow channel; a first detection device that detects the concentration of nitrate nitrogen in the wastewater; and a second detection device that detects the concentration of ammonia nitrogen in the wastewater, the second detection device being provided downstream of the first detection device, the method comprising a step for controlling the amount of air diffused from the plurality of air diffusion parts of the air diffusion device, forming a first-half aerobic region, a first-half combined-use region where both nitrification and denitrification progress, a denitrification region, a second-half combined-use region where both nitrification and denitrification progress, and a second-half aerobic region in the stated order from the upstream side along the flow channel, and furthermore producing first and second swirl flows constituting a pair in the flow channel, and a step for controlling the air diffusion amount in the first-half aerobic region and the first-half combined-use region on the basis of the concentration of nitrate nitrogen detected by the first detection device in the step for producing the first and second swirl flows and controlling the air diffusion amount in the second-half combined-use region and the second-half aerobic region on the basis of the concentration of ammonia nitrogen detected by the second detection device in the step for producing the first and second swirl flows, the first swirl flow rising in the first-half combined-use region, advancing downstream at the water-surface side of the denitrification region, descending near the center of the denitrification region, and advancing upstream at the bottom side of the denitrification region, and the second swirl flow rising in the second-half combined use region, advancing upstream at the water-surface side of the denitrification region, descending near the center of the denitrification region, and advancing downstream at the bottom side of the denitrification region.

5. The wastewater treatment method according to claim 4, wherein, in the step for producing the first and second swirl flows, an air diffusion device having a plurality of openable/closable air diffusion parts along the flow path is used as the air diffusion device, and the air diffusion parts by which air diffusion is performed are selected in accordance with a wastewater load amount, whereby the position of either of the first-half combined-use region or the second-half combined-use region is varied, and the position of at least one detection device from among the first and second detection devices is moved in accordance with the variation in the position of the first-half combined-use region or the second-half combined-use region.

6. The treatment apparatus according to claim 2, wherein the control device is configured so that:

the air diffusion amount in the first-half aerobic region and the first-half combined-use region is controlled on the basis of the difference between the concentration of nitrate nitrogen detected by the first detection device and the target concentration of nitrate nitrogen in the first-half aerobic region, which is set so that a denitrification amount required for reducing the concentration of nitrogen contained in the wastewater to a prescribed value or therebelow can be ensured in the denitrification region and so that a prescribed low-oxygen state can be formed in the denitrification region; and the air diffusion amount in the second-half combined-use region and the second-half aerobic region is controlled on the basis of the difference between the concentration of ammonia nitrogen detected by the second detection device and the target concentration of ammonia nitrogen permitted to remain in the treated water.

* * * * *